Patented Dec. 26, 1939

2,184,993

UNITED STATES PATENT OFFICE 2,184,993

REFRIGERATION

Curtis C. Coons, North Canton, Ohio, assignor to The Hoover Company, North Canton, Ohio, a corporation of Ohio No Drawing. Application March 6, 1937, Serial No. 129,351

7 Claims. (Cl. 252—5)

This invention relates to absorption refrigerating systems of the continuous type, and particularly to such systems wherein an inert gas such as nitrogen or hydrogen is utilized as a pressure equalizing medium. This general type of apparatus is disclosed in Patents No. 1,609,334 granted December 7, 1926, and No. 2,027,927 granted January 14, 1936.

More particularly, my invention relates to compositions of matter adapted to be used in refrigerating systems. Ammonia and water have long been known and used as the refrigerant and absorbent, respectively, in absorption refrigeration systems. These substances have several disadvantages. Ammonia requires high pressure if it is to be condensed by air cooling at room temperature. Water has the disadvantage that a large portion of the heat input to the system is utilized in vaporizing the water content of the absorption solution and in heating the water which has a high specific heat. Vaporized water must be condensed out of the vapor by rectification in order that it may not be carried into the evaporating system and freeze.

I propose to avoid these disadvantages in present refrigeration systems by utilizing a solution of ammonia ($NH_3$) and methylamine ($CH_3NH_2$) as the refrigerating agent, and monoethanolamine ($NH_2CH_2CH_2OH$) either alone or in combination with water as the absorbent.

A solution of methylamine and ammonia as a refrigerating agent is advantageous in that the pressure of the system for given temperature conditions is greatly below that which would be required were ammonia alone used. The vapor pressure of the solution of ammonia and methylamine will depend upon the proportion of each substance present. By varying the percentages of these two substances present in the solution, the vapor pressure of the solution may be varied from that of ammonia to that of methylamine. Accordingly, the pressure of the system will vary from the condensing pressure of ammonia to that of methylamine. In general, the higher the percentage of ammonia, the higher will be the pressure of the system. With small percentages of ammonia, the pressure of the system will approach the condensing pressure of methylamine.

When used alone monoethanolamine practically dispenses with the necessity for rectification of the vapor driven off from the generator, because of its extremely low vapor pressure at the temperatures and pressures commonly encountered in refrigerating systems of the type herein under consideration. The low vapor pressure of monoethanolamine has the further advantage that the absorbent is not carried over into the evaporator system and hence does not tend to dilute the inert gas.

When monoethanolamine is used as an absorbent in conjunction with water, the absorbing capacity of the system is increased and the presence of the monoethanolamine tends to decrease vaporization of water in the generator and to thus reduce heat losses and rectification difficulties.

Compared with water, monoethanolamine has a lower vapor pressure, specific heat, and heat of vaporization. These factors all tend to reduce generator and rectification heat losses.

The low pressures and temperatures possible with this system insure condensation of the refrigerant with high room temperatures.

The substances proposed herein for a refrigeration system have the further advantage that they corrode iron to a far lesser extent than do water and ammonia alone.

The combination of ammonia, methylamine, and monoethanolamine forms a stable fluid group for refrigerating systems utilizing hydrogen or nitrogen as an auxiliary agent due to the common constituents, hydrogen and nitrogen.

The fluid group ammonia, methylamine, monoethanolamine, and water is chemically stable due to the common constituent hydrogen. When this group is used with an auxiliary agent such as nitrogen, it is still stable due to the fact that nitrogen is common to all the elements of the group except water which is inherently stable under the conditions encountered in refrigerating systems. Of course, the fluid group is stable if hydrogen is the auxiliary agent as this substance is common to all elements of the fluid group.

Having thus described my invention, I claim:

1. A group of cooperating substances for refrigeration consisting of ammonia and methylamine, a solvent therefor comprising monoethanolamine, and a gaseous substance inert with respect to ammonia and methylamine and which has a common chemical constituent therewith and with the solvent.

2. A group of cooperating substances for refrigeration consisting of ammonia and methylamine, nitrogen, and a solvent including monoethanolamine for the ammonia and methylamine.

3. A fluid group for use in a refrigerator comprising a solution of ammonia and methylamine and a solvent therefor comprising monoethanolamine.

4. A fluid group for use in a refrigerator comprising a solution of ammonia and methylamine and a solvent therefor comprising monoethanolamine and water.

5. A fluid group for use in a refrigerating system comprising a refrigerant consisting of ammonia and methylamine, an absorbent consisting of monoethanolamine and water, and nitrogen.

6. A fluid group for use in a refrigerating system comprising an absorbent including monoethanolamine, a refrigerant comprising ammonia and methylamine, and a gaseous auxiliary agent which is inert with respect to the refrigerant and the absorbent.

7. A group of cooperating substances for use in refrigerating systems comprising a refrigerant including ammonia and methylamine, a solvent therefor including monoethanolamine, and an inert auxiliary agent consisting of hydrogen.

CURTIS C. COONS.